No. 650,758. Patented May 29, 1900.
S. LAKE.
COMBINED SURFACE AND SUBMARINE VESSEL.
(Application filed Apr. 2, 1897.)

(No Model.) 5 Sheets—Sheet 1.

WITNESSES
INVENTOR.
Simon Lake.
BY
James L. Norris.
ATTORNEY

No. 650,758. Patented May 29, 1900.
S. LAKE.
COMBINED SURFACE AND SUBMARINE VESSEL.
(Application filed Apr. 2, 1897.)

(No Model.) 5 Sheets—Sheet 2.

WITNESSES INVENTOR.
Simon Lake.
BY
ATTORNEY

No. 650,758. Patented May 29, 1900.
S. LAKE.
COMBINED SURFACE AND SUBMARINE VESSEL.
(Application filed Apr. 2, 1897.)
(No Model.) 5 Sheets—Sheet 5.

WITNESSES

INVENTOR.
Simon Lake.
BY James L. Norris
ATTORNEY

UNITED STATES PATENT OFFICE.

SIMON LAKE, OF BALTIMORE, MARYLAND.

COMBINED SURFACE AND SUBMARINE VESSEL.

SPECIFICATION forming part of Letters Patent No. 650,758, dated May 29, 1900.

Application filed April 2, 1897. Serial No. 630,442. (No model.)

*To all whom it may concern:*

Be it known that I, SIMON LAKE, a citizen of the United States, residing at Baltimore, in the State of Maryland, have invented new and useful Improvements in a Combined Surface and Submarine Vessel, of which the following is a specification.

This invention relates to a combined surface and submarine vessel and may be employed either as a torpedo-boat or for freight and general cruising purposes or for submarine work of all kinds.

It has for its object, first, to combine with a submarine vessel cylindrical in cross-section a superstructure built upon the submarine vessel and affording a large deck-surface, buoyancy, and a high freeboard for surface navigation, the space between the submarine vessel and the superstructure being adapted to be filled with water when the vessel is submerged, and thus rendered capable of resisting the pressure of the water.

It has for its further object to provide such a vessel with an improved conning-tower.

It has for a further object to provide improved observation-cages adapted to be raised and lowered and from which the movements of an enemy may be observed while the vessel is submerged at different depths within certain limits and from which the movements of the vessel may be controlled and the torpedoes fired.

It has for another object to provide an escape-buoy by means of which the occupants of the boat may be sent to the surface of the water and effect an exit from the buoy while the boat is submerged.

It has for a further object to provide an improved turret.

It has for a still further object to provide improved means for sounding and measuring the depth of the water.

It also has for another object to provide means for automatically regulating the submergence of the boat at any predetermined depth.

It has for another object to provide improved means for automatically trimming the boat when it is submerged, either while under way or at rest.

It has for a further object to provide wheeled weights suspended beneath the boat and adapted to travel on the water-bed or bottom, and thus enable the boat to travel over or above the bottom at a determined distance.

It also has for its object to provide a weight suspended beneath the center of buoyancy of the boat and operating to increase the stability of the boat and keep it on a level keel.

It finally has for its object to improve the construction generally of vessels of the character described and to increase their efficiency and practicability.

To these ends my invention consists in the features and in the construction, combination, and arrangement of parts hereinafter described and afterward definitely set forth in the claims following the description, reference being had to the accompanying drawings, forming a part of this specification, wherein—

Referring to the drawings, the numeral 1 indicates the hull of the submarine vessel, which, as shown, is of double conoidal form and cylindrical in cross-section. Within this hull are arranged all of the operative parts of the vessel, to be hereinafter described. Attached to the bottom of the hull and extending fore and aft nearly the entire length thereof is a keel 2, and attached to the sides of said hull and projecting horizontally therefrom are two planes 3. Built upon the upper side of the vessel 1 is a superstructure comprising a flat horizontal deck 5 and vertical sides 6, said superstructure conforming to the horizontal sectional shape of the vessel 1 and attached thereto water and air tight. This superstructure adds material buoyancy to the vessel when the latter is cruising as a surface boat and also gives to the vessel a good freeboard and ample deck-space. When cruising as a surface boat, the vessel may be equipped with masts 7 and is provided with a guard-rail extending fore and aft around the sides of the deck and comprising a rope or cable 8, supported on stanchions 9. The stanchions 9 are fitted in tubes 10, which depend from the deck 5 and are closed at their lower ends to prevent the passage of water therethrough. The stanchions are held in their elevated positions by keys 11, and when it is desired to submerge the vessel said keys are removed and the stanchions lowered into their tubes and the masts are unshipped.

Disposed upon each side of the vessel 1 and between the upper side thereof and the deck of the superstructure are torpedo-tubes 12, four in number, two of said tubes being directed forward and two aft, the breeches of the tubes opening into torpedo-rooms 13 and closed by breech-blocks 14 and closed at their muzzle ends by gate-valves 15. An isolated observation-room 16 is located in the bow of the superstructure and is provided with observation-ports 17. Entrance to said room from the boat 1 is had through the hatchway 18. Extending lengthwise throughout the vessel 1 are two parallel decks 19 and 20, which are formed water and air tight and divide the vessel into three air-tight compartments $a$, $b$, and $c$, in the central one of which is arranged the machinery of the vessel. Supported upon the deck 19 in the central part of the vessel is a conning-tower 21, which projects through and above the deck 5 of the superstructure and is provided at its top with a covered hatchway 22. A turret 23 is arranged on the conning-tower and is adapted to revolve on antifriction-balls 24. Entrance is had to said turret through an aperture 25, formed in its bottom, and the turret is connected water-tight to the conning-tower by a gland 26 and packing 27. As a further safeguard against the entrance of water a cap 28 may be secured under the aperture 25. The turret is revolved by a pinion 29, fixed on a shaft projecting through the bottom of the turret and provided at its upper end with a hand-wheel 30, said pinion gearing with an annular rack 31, fixed on the top of the conning-tower. Arranged in the turret is a rapid-fire gun 32, which projects through the wall of the turret and is fitted water-tight therein by a ball-and-socket joint 33. The gun is elevated and depressed by a hand-screw 34, connected at its upper end to the top of the turret, and is trained horizontally by rotating the turret by means of the hand-wheel 30. In the conning-tower is arranged a steering-wheel 35, which through the medium of tiller-ropes 36 operates the rudder 37 in the usual manner. Ingress and egress may be had to and from the conning-tower when the vessel is afloat through the hatch 22 and may also be had when the vessel is submerged through an air and water lock 38, which is provided with a door 39, opening into the conning-tower, and with a door 40, opening into a companion-way 41, extending to the deck of the superstructure. A covered hatchway 42 leads from the forward torpedo-room 13 to the deck 5 and access from said room to the interior of the vessel is had through a hatch 43. Water may be admitted to the interior of the superstructure through ports controlled by valves 44, the stems of which project into the interior of the vessel 1, and when the water is thus admitted the air is permitted to escape through a valve 45, arranged in the top of the superstructure immediately in front of the conning-tower. A check-valve 46 is arranged in the stern of the superstructure, through which the water is expelled when compressed air is admitted to the interior of the superstructure from a compressed-air reservoir, hereinafter described.

In the lower compartment $c$ are arranged tanks 47, which are adapted to contain water to serve as ballast, and a pump 48, located in the compartment $b$, is connected to said tanks by pipes 49, by means of which the tanks may be emptied. The vessel 1 is provided with twin propellers 50, the shafts of which are driven by gas-engines 51, which are supplied from tanks or reservoirs. (Not shown.) Both engines exhaust through a common exhaust-pipe 52 into a condenser 53, in which the hot gases are condensed before they make their exit through an escape-valve 54. A check-valve is arranged between the condenser and escape-valve to prevent the entrance of water. Arranged in the compartment $c$ is a counter-shaft 55, which is driven by one of the engines 51 by means of a sprocket-chain 56, and said shaft, by means of a chain 57, operates the pump 48. Said counter-shaft also actuates an air-pump 58, which operates to compress air and store it in a reservoir 59. From this reservoir the supply of air to the compartment $b$ may be renewed from time to time when the vessel is submerged and may also be discharged into the superstructure through a valved air-pipe 59ᵃ to discharge the water therefrom.

Driven by each of the engine-shafts is a combined dynamo and motor 60, which is electrically connected to a battery of secondary cells located in a locker 61. When the vessel is propelled by its engines, the dynamos operate to generate and store up electricity in the battery, and when desired the engines may be thrown out of action and the dynamos then act as motors and operate to drive the propellers. The dynamos also operate to store up electricity in the storage battery to operate the various different motors hereinafter described; but to avoid confusion the connections between the dynamos and battery and between the battery and the motors are not shown.

Arranged below the bow and stern of the vessel are vertically-operating propellers 62 and 63, the shafts of which project up into the compartment b, as shown, and are driven by electric motors 64, which derive their motive force from the storage battery, before referred to. Said propellers exert their force in a vertical direction and operate to raise or lower the bow and stern of the vessel to maintain the latter on an even keel while the boat is submerged, and this operation is rendered automatic by the following-described means, (most clearly shown in Figs. 14, 15, and 16:) Referring to said figures, the numeral 65 indicates a disk of non-conducting material, in which is formed an annular groove 66, T-shaped in cross-section, as indicated by the dotted lines. Four binding-posts 67, 68, 69, and 70 are provided, each of which is formed with a headed neck 71, which is adapted to seat within said groove and by means of which the binding-posts may be adjusted in their positions. A metallic pendulum 72 is pivoted to the center of the disk 65 and is electrically connected to the storage battery by a wire 73, while the binding-posts 67, 68, 69, and 70 are connected by wires 74 to the motors 64. Return-wires (not shown) lead back from the motors to the battery. The motors 64 operate in opposite directions, so that when the forward propeller operates to raise the bow the after propeller operates to depress the stern, and vice versa. Should the bow sink lower than the stern, the pendulum swings upon its pivot and makes contact with the binding-posts 67 and 68 and closes the circuit through the motors, upon which the latter operate to drive the propellers and raise the bow and depress the stern, and should the stern sink lower than the bow the pendulum swings in the opposite direction and closes the circuit through the binding-posts 69 and 70, and thus reverses the motors, which then operate to raise the stern and depress the bow. The fore-and-aft trim of the boat may also be effected when the boat is submerged and under way by leveling-vanes 75 and 76, arranged at the bow and stern, respectively. Said vanes are arranged on the opposite sides of the boat and are fixed on the ends of shafts 77, which extend through the boat transversely. On the shafts 77 are fixed levers 78, which are united by crossed cables 79, whereby when one of the vanes is turned in one direction the other vane will be simultaneously turned in the opposite direction. If the bow of the boat is lower than the stern, then by turning the vanes so that the forward edge of the forward vane is elevated and the forward edge of the after vane is depressed the bow will be raised and the stern will be depressed by the resistance offered by said vanes to the water in a well-known manner, and vice versa, and this operation is performed automatically by the mechanism most clearly shown in Figs. 18 and 19. Referring to said figures, the numeral 80 indicates a vessel consisting of two cup-shaped members secured together at their edges and having a flexible diaphragm 81 arranged between said edges. To the diaphragm there is attached a rod 82, that is guided in a fixed bracket 83, and said rod is loosely connected to one end of a lever 84, which is fixed at its other end to the vane shaft 77. A pipe 85 leads from the under side of the vessel 80 and at its other end projects through the boat and opens into the water. A pressure is thus placed upon the under side of the diaphragm equal to the pressure of the water surrounding the boat. There are two such devices provided, one for each vane-shaft. Should the bow of the boat sink lower than the stern, the pressure of the water under the diaphragm in the forward vessel will exceed the pressure beneath the diaphragm in the after vessel, and the diaphragm will then raise the rod 82 and turn the vanes 75 in the position shown in Fig. 4, and the vanes 76 are simultaneously turned in the opposite direction by the cables 79. The boat will then be caused to assume a level keel, and in the same manner will be leveled should the stern sink lower than the bow.

Figure 5:
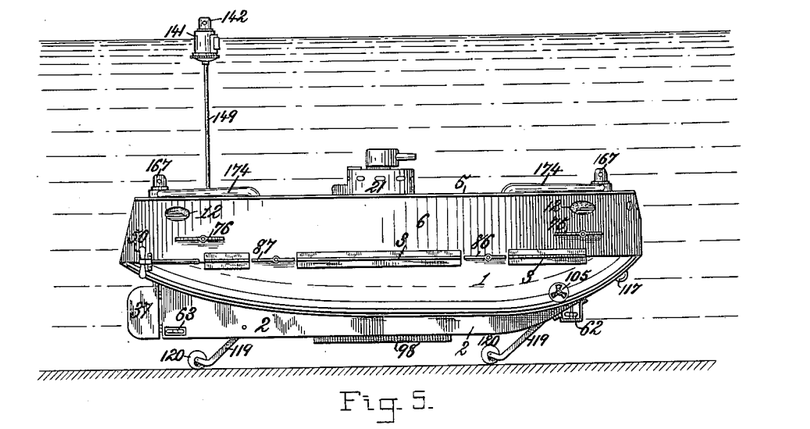
Fig. 5 is a view showing the boat submerged and traveling on the water-bed, the escape-buoy being shown afloat.
Figure 6:
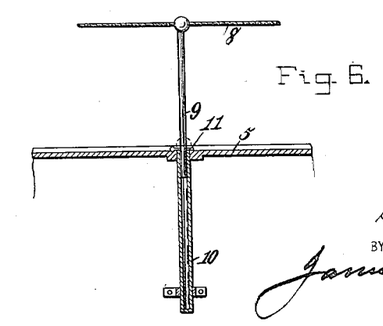
Fig. 6 is a detail view illustrating the manner of housing the stanchions of the guard-rail on the superstructure.
Figure 7:
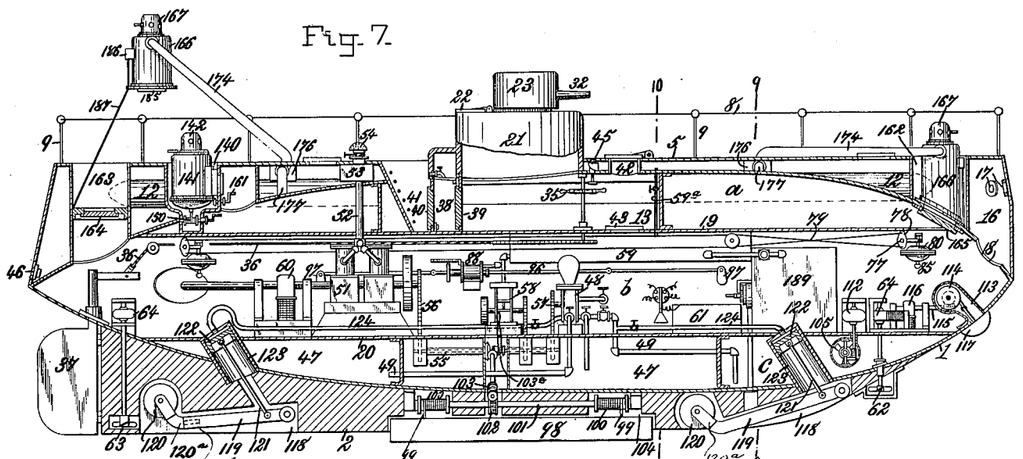
Fig. 7 is a central vertical longitudinal section of the boat.
Figure 8:
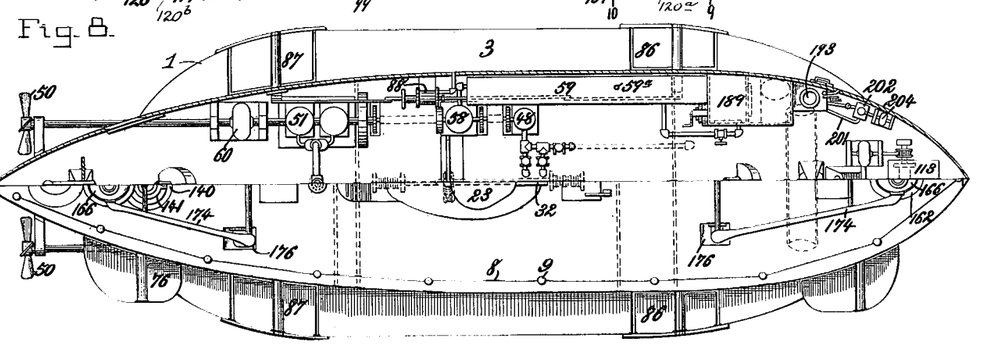
Fig. 8 is a half-plan and half-sectional view.
Figures 9, 10, 11, 12, 13, 14, 15, 16:
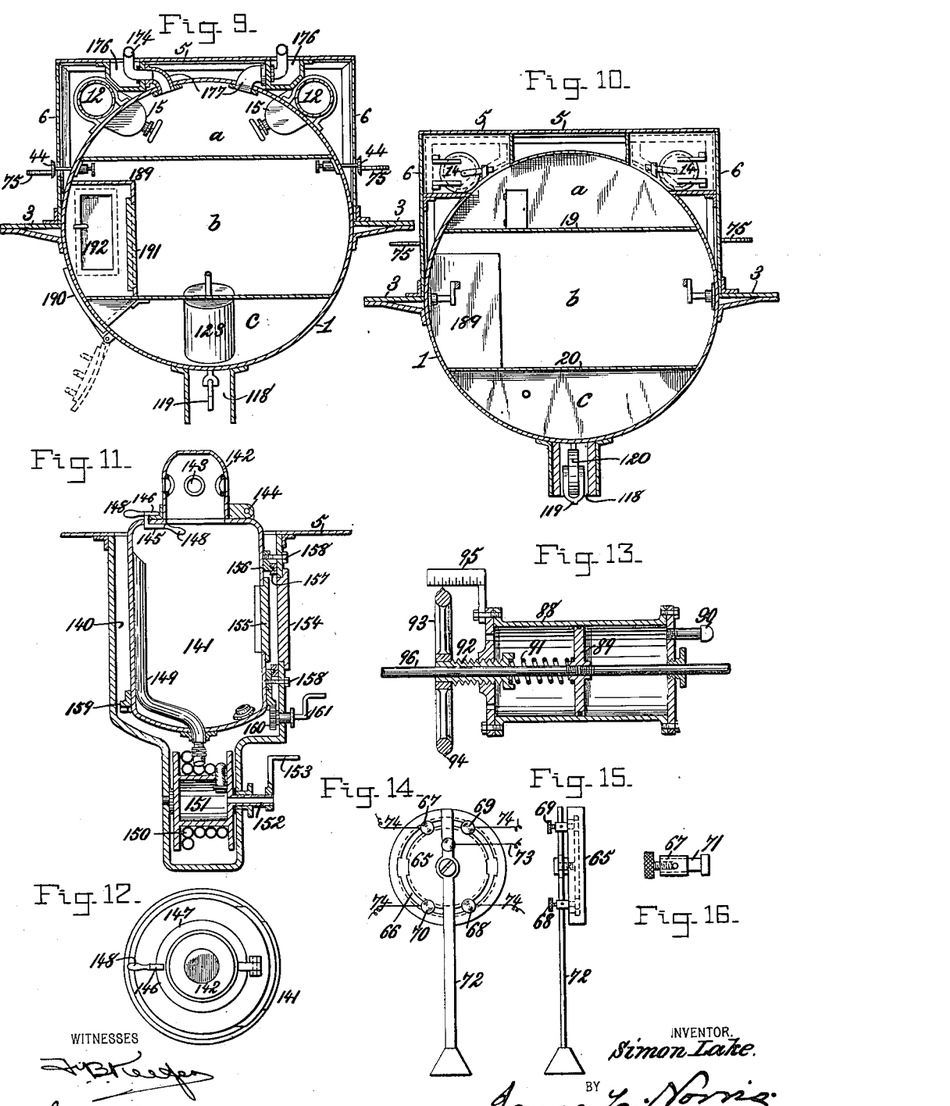
Fig. 9 is a transverse section on the line 9 9 of Fig. 7.
Fig. 10 is a similar view on the line 10 10 of said figure.
Fig. 11 is a detail sectional view of the escape-buoy in position for submergence.
Fig. 12 is a top plan view thereof.
Fig. 13 is a detail sectional view of the device for automatically controlling the submergence of the vessel.
Figs. 14, 15, and 16 are detail views of the means for electrically controlling the trim of the boat.
Figure 17:
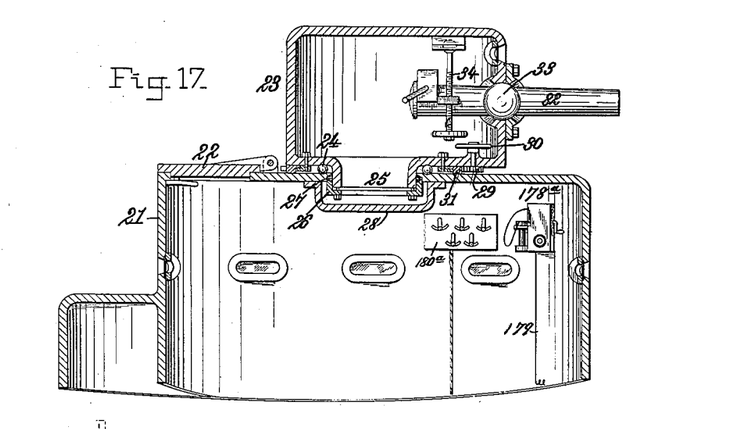
Fig. 17 is a detail sectional view of the gun-turret and conning-tower.

For causing the boat to be submerged to any given depth the following means are provided: Arranged on the opposite sides of the boat are vanes 86 and 87, that are fixed on shafts extending transversely through the boat. The vanes are preferably arranged in recesses in the planes 3, so that when they are in a horizontal plane they practically form a part of said planes, as shown in Fig. 5. Referring to Figs. 7 and 13, the numeral 88 indicates a cylinder, in which works a piston 89. Into one end of the cylinder is tapped a pipe 90, which at its other end passes through the side of the boat and opens into the water, and hence the water presses on one side of the piston with a pressure equal to the pressure of the water surrounding the boat. On the opposite side of the piston is a coiled spring 91, the tension of which is regulated by a threaded sleeve 92, tapped through the end of the cylinder and provided with a hand-wheel 93. A knife-edge 94 is formed on the periphery of the hand-wheel and operates to indicate on a scale 95 the tension which the spring 91 is placed under. Piston-rods 96 are attached to the piston at their adjacent ends and at their opposite ends are attached to cranks 97 on the shafts of the vanes, one of said rods passing through the sleeve 92.

The operation of the device is as follows: If it is desired to sink to a certain depth, the vessel is placed in a state of equilibrium, the hand-wheel 93 is turned until the knife-edge 94 registers with the graduation on the scale 95 corresponding to the desired depth, and the spring 91 is thus placed under a tension equal to the pressure of water at such depth and forces the piston forward, and with it the rods 96, which turn the vanes 86 and 87 to the position shown in Fig. 3. As the vessel is propelled ahead the vanes cause it to sink until the desired depth is reached, when the pressure of the water will balance the tension of the spring and force back the piston, thus restoring the vanes to the position shown in Fig. 5. If the boat descends below the desired depth, the pressure of the water will exceed the tension of the spring and the piston will be forced back and turn the vanes into the position shown in Fig. 2, and the vessel will thus be caused to ascend. The boat will thus be caused to maintain the desired depth of submergence automatically.

For the purpose of adding stability to the boat and aid in maintaining it on a level keel I provide a weight 98, suspended by cables 99 from drums 100, mounted on a shaft 101. On the shaft 101 is fixed a worm-wheel 102, which meshes with a worm 103, driven by the auxiliary shaft 55, before described. The worm 103 may be thrown into and out of engagement with the auxiliary shaft 55 by a clutch 103$^a$, of any well-known construction. The weight being below the center of gravity of the boat aids in maintaining the boat on a level keel. It also serves as a recoverable drop-keel to be used in cases of emergency, for by releasing the cable hoisting mechanism the weight is permitted to descend and rest on the bottom, thus increasing the buoyancy of the boat and permitting it to ascend. The weight may afterward be raised to its seat in the recess 104 by the cable hoisting mechanism described.

Figures 18, 19, 20, 21, 22:
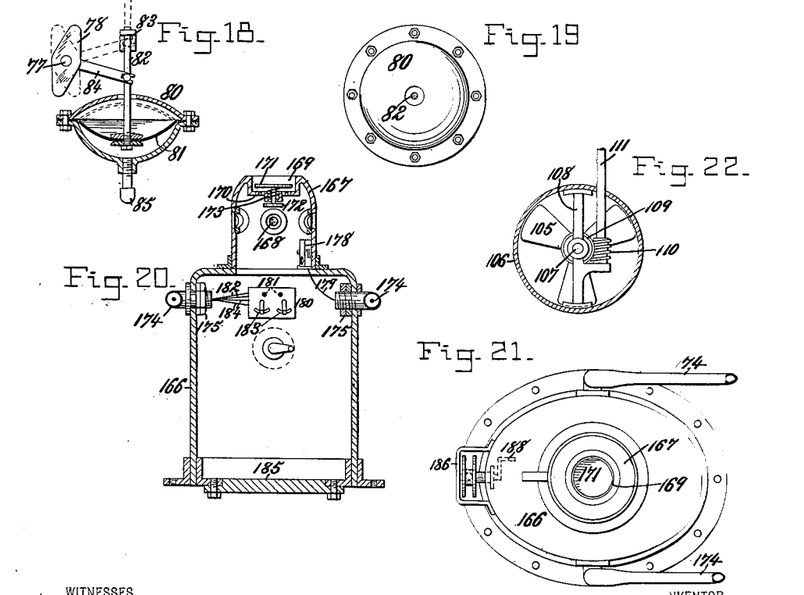
Fig. 18 is a detail sectional view of one of the devices for controlling the vanes that regulate the trim of the vessel.
Fig. 19 is a top plan view thereof.
Fig. 20 is a detail sectional view of one of the observation-cages.
Fig. 21 is a top plan view thereof.
Fig. 22 is a detail view of the propeller for swinging around the bow of the boat.

In order to turn the boat quickly, I provide what I term an "athwartships" propeller, (indicated by the numeral 105 and most clearly shown in Figs. 7 and 22.) As shown in said figures, the propeller is arranged in a tube 106, extending transversely through the under and forward portion of the vessel, and is fixed on a shaft 107, journaled in a bracket 108, fixed in the tube. On the shaft 107 is mounted a worm-wheel 109, which gears with a worm 110 on an upright shaft 111. The shaft 111 extends up into the compartment $b$ and is driven by an electric motor 112. The said propeller will operate to force the bow of the vessel around in one direction or the other, according to the direction in which the propeller is rotated, in an obvious manner.

In the bow of the boat is a well 113, (see Fig. 7,) in which is arranged a drum 114, actuated by a worm-shaft 115, driven by an electric motor 116, and on the drum is wound a cable carrying an anchor 117.

Recesses 118 are formed in the forward and after part of the keel, (see Fig. 7,) and in said recesses are pivoted weights 119, consisting of heavy or weighted arms, in the free ends of which are journaled wheels 120. The weights are bent near their point of attachment to the wheels, as shown, and to said weights are connected rods 121, which are connected at their other ends to pistons 122. The pistons 122 are fitted in cylinders 123, arranged in the bottom of the boat and connected with pipes 124, leading to the pump 48. By admitting water into the cylinders 123 the weights 119 drop by gravity into the position shown in Fig. 5, in which position the wheels rest on the bottom, and the boat is thereby relieved of the greater portion of the weight of the arms and is thus rendered buoyant. Should the boat attempt to ascend, however, the weight of the said arms before they could be lifted from contact with the bottom would overcome the buoyancy of the vessel and prevent its further ascent. By these means the boat would be caused to maintain a course parallel with the bottom, the wheels yielding and riding over slight obstructions. If sufficient water only is admitted to the cylinders to permit the weights 119 to drop but a slight distance below the keel, the bent portions of the weights would then come in contact with the bottom, while the wheels would remain in their housings, and in this position the weights 119 would travel over the bottom after the manner of sleigh-runners; but the weights 119 would continue to act in the manner before described. The weights 119 would be used in this manner when the vessel is traveling over a bottom too soft to permit the practical operation of the wheels. It will thus be seen that the weights 119 in reality are merely weights that may be dropped from the vessel, and thus render the latter buoyant, but prevent the vessel from ascending above a certain distance, limited only by the length of the connections which hold the weights attached to the boat, consisting, in the present instance, of the arms themselves.

The yokes 120$^a$, in which the wheels 120 are rotatably journaled, may be swiveled in the ends of the weights 119, as at 120$^b$, (clearly indicated by dotted lines in Fig. 7 of the drawings,) whereby the wheels are free to turn after the manner of caster-wheels as they travel over the bottom.

Figure 4:
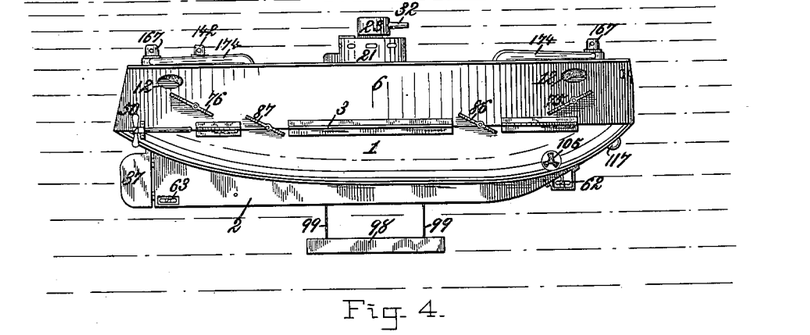
Fig. 4 is a similar view showing the entire vessel completely submerged.

To enable observations to be made from the surface when the vessel is submerged and to permit of one or more of the crew being sent to the surface and escaping without raising the boat, I provide a buoy constructed as follows, reference being had to Figs. 4, 7, 11, and 12. In the after part of the superstructure is formed a well 140, in which is housed the buoy, consisting of a closed cylindrical shell 141, in the top of which is arranged a hood 142, provided with bull's-eyes 143, through which observations may be made. The hood 142 is hinged to the buoy, as at 144, and is adapted to be closed water-tight by a latch 145, rotatably fixed in the top of the buoy and having a lug 146, which engages a flange 147, formed on the bottom of the hood. To enable the hood to be opened and closed from either the inside or outside of the buoy, the latch is provided with two handles 148. An air-pipe 149 projects through the bottom of the buoy and extends to near the top thereof, and to the lower end of said pipe is coupled a hose 150, which is wound about a drum 151, journaled in the bottom of the well. The drum is hollow, as shown most clearly in Fig. 11, and is provided with a hollow shaft or trunnion 152, which projects through a stuffing-box in the side of the well. The end of the hose 150 is connected with the interior of the drum, and thus supplies air to the buoy and also serves as a speaking-tube. A crank 153 is fixed on the end of the shaft 152, by means of which the drum may be rotated. A door 154 is arranged in the side of the well 140 and communicates with a room in the superstructure, and a corresponding door 155 is formed in the side of the buoy. A frame 156 is attached to the exterior of the buoy and surrounds the door 155 and is adapted to engage a rubber packing fitted in a corresponding frame 157, attached to the well-casing and surrounding the door 154. Bolts 158 are tapped through the well-casing and engage threaded apertures formed in the frame 156, by which means the two frames 156 and 157 may be drawn up together water-tight. The door 155 is smaller than the door 154, and by removing the latter door the door 155 may also be removed and withdrawn through the doorway in the well. When the doors have been thus removed, one of the crew may enter the buoy, after which the doors are replaced. Then by withdrawing the bolts 158 the buoy is released and ascends to and floats upon the surface of the water, as shown in Fig. 4, unwinding the hose 150 as it ascends. The occupant of the buoy can then freely make observations in every direction through the bull's-eyes in the hood and can communicate with the interior of the boat through the air-pipe 149 and hose 150. By turning the catch 145 and raising the hood 142 the occupant of the buoy may emerge from the latter and by closing the hood and fastening it places the buoy in condition to be returned to the submerged boat. This is accomplished by winding up the hose on the drum from the interior of the vessel, and in order to properly house the buoy in the well to be engaged by the bolts 158 I attach to the exterior of the buoy a circular rack 159, which is engaged by a pinion 160, fixed on the end of a crank-shaft 161, projecting through a stuffing-box in the side of the well. By turning the crank 161 the buoy is rotated until the bolt-holes in the frame 156 register with the bolts 158, when the frames 156 and 157 may again be fixed water-tight, the doors 154 and 155 removed, and another man sent to the surface in the manner before described.

Figure 2:
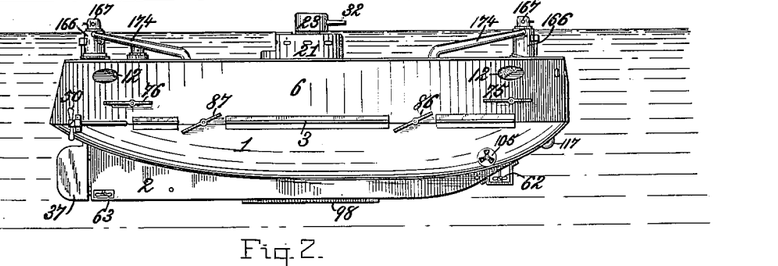
Fig. 2 is a view showing the boat submerged, with only the turret and observation-cages projecting above the surface of the water.
Figure 3:
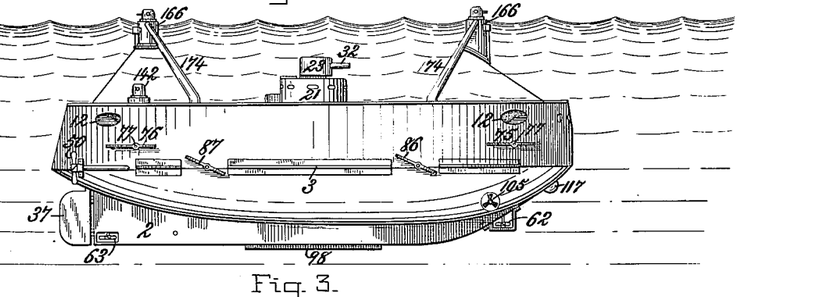
Fig. 3 is a similar view showing the turret submerged.

Observations may also be made, the movements of the boat controlled, and the torpedoes discharged when the boat is only partially submerged, as shown in Fig. 2, or when submerged only to a limited distance, as shown in Fig. 3, by means of observation-cages, (shown in detail in Figs. 20 and 21,) which I will now describe. Wells 162 and 163 are formed, respectively, in the forward and after part of the superstructure and communicate with the interior of the boat by hatches or doors 164 and 165. In the wells are housed the observation-cages, and as the construction of both cages is identical it will only be necessary to describe one of them. Referring to Figs. 20 and 21, the cage is illustrated as consisting of a closed cylindrical vessel 166, having fixed in its upper end a hood 167, provided with bull's-eyes 168. In the top of the hood is formed a cylindrical recess 169, having a perforated bottom 170, and arranged over said bottom is a disk valve 171, having a stem projecting through the bottom and provided at its lower end with a stop 172. A coiled spring 173 is arranged about the stem of the valve and operates when the cage is afloat to raise the valve and permit the entrance of air to the interior of the cage. When the cage is submerged, the pressure of the water operates to hold the valve closed and prevent the entrance of water. The cage is connected to the boat by two hollow arms 174, which at their upper ends are bent inward at right angles toward each other and are threaded, as most clearly shown in Fig. 20. The upper bent ends of said arms project through apertures formed in the opposite sides of the cage 166 and are secured rotatably, but water-tight therein, by lock-nuts 175. The lower ends of the arms 174 project through the side walls of sinks 176, formed in the deck of the superstructure, and are rotatably connected with elbow-pipes 177, which communicate with the interior of the boat 1. The cage is thus free to rise and fall or have a swinging movement on the arms, the upper ends of the arms turning in the sides of the cage and their lower ends turning in the sides of the sinks 176 and in the elbow-pipes 177. A telephone 178 is arranged in the hood 167 and is connected with a telephone 178$^a$ in the conning-tower by conductors 179, which pass down through one of the hollow arms 174. A switchboard 180 is arranged in the cage 166 and is provided with two push-buttons 181, which control the torpedo-firing mechanism (not shown) of the two torpedo-tubes arranged in the same end of the boat as the cage, said switches being in circuit with wires 182, which pass down into the boat through one of the hollow arms 174. The switchboard is also provided with two switches 183, which are connected by wires 184, also passing down through said arm, with the motor 112, which actuates the steering or athwartships propeller 105, and by turning one or the other of said switches said propeller may be operated to turn the boat in either direction desired to properly train the torpedo-tubes on an enemy. The cage 166 is provided at its bottom with a door 185, which is adapted to register with the door in the bottom of the well, and the construction and arrangement of said doors are precisely the same as the doors 154 and 155 in the escape-buoy before described, and therefore need not be shown and described in detail. Arranged on the exterior of the cage is a drum 186, about which is wound a cable 187, that is attached to the bottom of the well. The shaft of the drum projects through a stuffing-box in the side of the cage, and on its inner end is fixed a crank 188, by means of which the drum may be rotated from the interior of the cage and the latter be thus hauled down into its well. The operation of the cages will be understood. The pilots or gunners may enter the cages either while the boat is afloat or submerged and the doors closed in the same manner as that described with reference to the escape-buoy. If the boat be only partially submerged—that is to say, be submerged so that the top of the conning-tower is approximately awash, as shown in Fig. 2—the cages will be afloat with their hoods 167 only projecting above the surface of the water and the lower part of the cages in their wells, or the boat may be entirely submerged for a short distance, in practice about fifteen feet, as shown in Fig. 3, when the cables 187 will unwind and permit the cages to float upon the surface. The buoyancy of the cages, if the boat be ballasted only slightly more than is sufficient to sink her, will prevent the boat from sinking to a greater depth than the length of the arms 174 will permit, or this depth may be regulated by means of the cables 187 and drums 186. The occupants of the cages can freely make observations in every direction and can control the actions of the boat at will. An air and water lock and a diver's chamber 189 are arranged in the compartment b, and a door 190 (see Fig. 9) is arranged in the bottom of the diver's chamber. A diver equipped with the proper diving-armor may pass from the interior of the boat to the exterior by entering the air and water lock and closing the door 191 behind him and then pass into the diver's chamber and close the door 192 behind him, when by opening the door 190, as shown by dotted lines in Fig. 9, he may pass out of the boat. In the same manner he may return. No detailed description or illustration of the lock and diver's chamber, however, is necessary, as the same forms no part of the present invention, being fully shown and described in my application for patent filed April 5, 1893, and serially numbered 469,109, and since patented on the 20th day of April, 1897, No. 581,213. A switchboard 180$^a$ is arranged in the conning-tower and is provided with switches controlling the steering-propellers, the torpedo-firing mechanism, and the various other electrically-controlled mechanisms.

Figure 1:
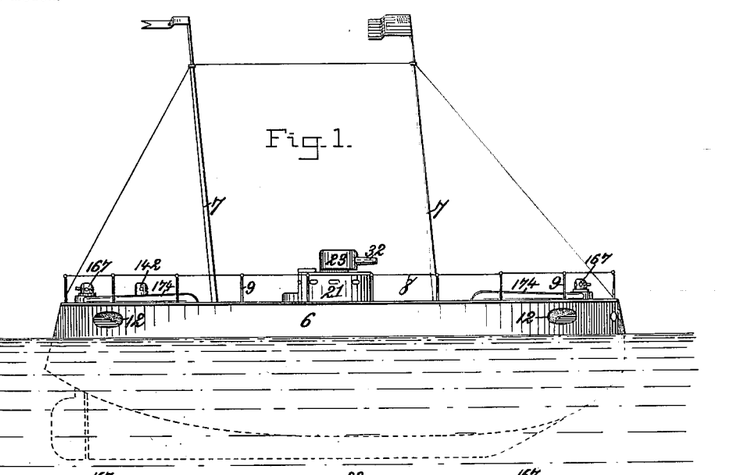
Figure 1 is a view of my improved vessel adapted as a torpedo-boat and arranged in cruising trim.

The operation of my improved boat may be briefly reviewed as follows: In Fig. 1 the vessel is shown rigged for surface navigation, the masts being stepped in place and the guard-rail in position. In this trim the superstructure affords ample deck room and a high freeboard and also materially adds to the buoyancy of the vessel. Should it be desired to submerge the vessel, the masts are unshipped and the guard-rail lowered by dropping the stanchions 9 into their tubes 10. A predetermined quantity of water is then admitted into the ballast-tanks 47 in the bottom of the boat. The air-valve 45 and inlet-valves 44 are next opened, allowing water to flow into the space between the top of the vessel 1 and the deck of the superstructure, which still further reduces the buoyancy of the vessel. The pilots having previously taken position in the observation-cages 166, if a sufficient quantity of water has been admitted to the water-ballast tanks the vessel will assume the position shown in Fig. 2, in which position only the turret and the hoods of the observation-cages will be exposed above the surface of the water. When the vessel is submerged in this manner, the rapid-fire gun may be put into action to ward off the attack of small boats. Should it be desired to still further submerge the vessel, an additional quantity of water may be admitted to the water-ballast tanks sufficient to overcome the buoyancy of the turret, and the occupants of the observation-cages permit the cables 187 to unreel, when the boat will sink to the position shown in Fig. 3 and is prevented from sinking farther without admitting further water ballast by the buoyancy of the observation-cages. In both the positions above referred to the occupants of the observation-cages have full control of the boat, as they are in telephonic communication with the conning-tower and can control the athwartship-propeller to train the vessel to starboard or port and discharge the torpedoes when the target is in alinement. If it is desired to disappear entirely from the surface, an additional quantity of water is admitted to the ballast-tanks, sufficient to overcome the buoyancy of the observation-cages, which are drawn down into their wells, and their occupants then pass to the interior of the boat in the manner heretofore described. The depth-regulating mechanism (shown in Fig. 13) is then set for the depth desired, thus placing the vanes 86 and 87 in the position shown in Fig. 3, and the vessel then propelled ahead. The said vanes cause the boat to sink to the depth at which the mechanism may be set for and, in connection with the leveling-vanes 75 and 76 and their automatic controlling mechanism and the vertical propellers and their regulating device, operate to maintain the desired depth; or the vessel may be still further ballasted and permitted to settle on the bottom, when the arms 119 are dropped below the keel until the wheels 120 rest on the bottom and render the vessel again buoyant, as before described. If the bottom is too soft for the wheels to properly travel thereover, the arms are allowed to drop only sufficiently to cause their bent portions to project below the keel, when they will then act as runners in the manner heretofore described. When in this position, communication may be had with the surface of the water by means of the escape-buoy, as shown in Fig. 4 and described above.

I do not wish to be understood as confining myself to the exact details of construction herein shown and described, as many modifications can be devised without departing from the spirit of my invention. I also wish it to be understood that while I have shown and described the invention as applied to a torpedo-boat I do not limit my invention thereto, as it will be manifest that the invention is equally well adapted for vessels designed for submarine work of all kinds, for scientific research and investigations, for carrying freight, or for pleasure, the necessary modifications or arrangement of space and the like readily suggesting themselves to those skilled in the art.

Having described my invention, what I claim is—

1. The combination with a submarine vessel, of a closed superstructure fixed upon said vessel air and water tight, means for admitting water to the interior of said superstructure, and means for ejecting the water therefrom, substantially as described.

2. The combination with a submarine vessel, of a closed superstructure fixed upon said vessel air and water tight, means for simultaneously admitting water to the interior of said superstructure and permitting the escape of air therefrom, and means for ejecting the water, substantially as described.

3. The combination with a submarine vessel, and carrying a compressed-air reservoir, of a closed superstructure fixed upon said vessel air and water tight, an air-escape valve arranged in the deck of said superstructure, water-inlet valves for admitting water to the interior of the superstructure, and an outwardly-opening check-valve for permitting the escape of the water from the superstructure when compressed air is admitted to the interior thereof from the compressed-air reservoir, substantially as described.

4. The combination with a submarine vessel, of a closed superstructure fixed upon said vessel air and water tight, and having an observation-room arranged in the bow thereof, a hatch for establishing communication between said observation-room and the interior of the submarine vessel, and means for admitting water to and expelling it from the interior of the superstructure, substantially as described.

5. The combination with a submarine vessel, of a closed superstructure fixed upon said vessel air and water tight, means for admitting water to and expelling it from the interior of said superstructure, and a collapsible guard-rail arranged around the deck of said superstructure and comprising a plurality of stanchions movably fitted in tubes depending from said deck and closed at their lower ends, a cable connected to the upper ends of the stanchions, and keys adapted to pass through said stanchions to hold them in their raised positions, substantially as described.

6. The combination with a submarine vessel, of a closed superstructure fixed upon said vessel air and water tight and having a flat deck, a conning-tower fixed on the said vessel and communicating with the interior thereof, said conning-tower projecting through and above said superstructure, and an air and water lock communicating with the interior of the conning-tower and with the deck of the superstructure to permit ingress and egress to and from the conning-tower when submerged, substantially as described.

7. The combination with a submarine vessel, of a closed superstructure fixed upon said vessel air and water tight, torpedo-tubes arranged in the fore and after part of said superstructure and communicating at their breech ends with the interior of the said vessel, and gate-valves for closing the outer ends of said torpedo-tubes, substantially as described.

8. The combination with a submarine vessel, of a buoy, means for passing back and forth from the interior of the vessel to the buoy when the vessel is submerged, a door for closing said buoy water-tight, a drum, a hose wound about the drum and communicating with the interior of the vessel at one end and connected at its other end to the buoy, and means for rotating the drum to raise and lower the buoy, substantially as described.

9. The combination with a submarine vessel, of a buoy, means for passing back and forth from the interior of the vessel to the buoy when the vessel is submerged, a door for closing said buoy water-tight, a hollow drum, a hose wound about the drum and communicating with the interior thereof and connected at its other end to the buoy, and a hollow crank-shaft projecting into the interior of the vessel for rotating the drum to raise and lower the buoy, substantially as described.

10. The combination with a submarine vessel, of a buoy having a hood arranged on its upper end and provided with bull's-eyes, means for passing back and forth from the interior of the vessel to the buoy when the vessel is submerged, a door for closing the buoy water-tight, a hose leading from the buoy to the interior of the vessel and means for winding up and unwinding said hose to raise and lower the buoy, substantially as described.

11. The combination with a submarine vessel, of an observation-buoy having a hood hinged to its upper end and provided with bull's-eyes, a latch for locking said hood water-tight, means for passing back and forth from the interior of the vessel to the buoy when the vessel is submerged, a door for closing the buoy water-tight, a hose leading from the buoy to the interior of the vessel, and means for winding up and unwinding said hose to raise and lower the buoy, substantially as described.

12. The combination with a submarine vessel, of a buoy, means for passing back and forth from the interior of the vessel to the buoy when the vessel is submerged, a door for closing said buoy water-tight, an air-pipe projecting through the bottom of the buoy and extending to near the top thereof, a hollow drum, a hose wound about the drum and communicating with the interior thereof and connected at its other end to the lower end of said air-pipe, and a hollow crank-shaft projecting into the interior of the vessel for rotating the drum to raise and lower the buoy, substantially as described.

13. The combination with a submarine vessel having a well in its deck, of a buoy housed in said well, means for passing back and forth from the interior of the vessel to the buoy when the vessel is submerged, a door for closing said buoy water-tight, a hollow drum journaled in the bottom of said well and provided with a hollow crank-shaft projecting into the interior of the vessel, and a hose connected at one end to the buoy and at its other end wound about and communicating with the interior of the drum, substantially as described.

14. The combination with a submarine vessel having a well in its deck, of a buoy housed in said well, means for passing back and forth from the interior of the vessel to the buoy when the vessel is submerged, a door for closing said buoy water-tight, a hollow drum journaled in the bottom of said well and provided with a hollow crank-shaft projecting into the interior of the vessel, a hose connected at one end to the buoy and at its other end wound about and communicating with the interior of the drum, and means for detachably fastening the buoy in the well, substantially as described.

15. The combination with a submarine vessel having a well in its deck, of a buoy housed in said well, a door arranged in one side of said buoy, a corresponding door arranged in the side of the well, means for effecting a water-tight seal around said doors, means for locking the buoy in the well, a hose communicating at one end with the interior of the buoy and at its other end with the interior of the vessel, and means for winding up said hose to draw the buoy into the well, substantially as described.

16. The combination with a submarine vessel having a well in its deck, of a buoy housed in said well, a door arranged in one side of said buoy, a corresponding door arranged in the side of the well, a frame attached to the well-casing and surrounding the door and provided with a rubber packing, a corresponding frame attached to the side of the buoy and surrounding the door in said buoy, bolts projecting through the well-casing and engaging the frame on the buoy, said bolts operating to draw said frames together water-tight, and a hose communicating at one end with the interior of the buoy and at its other end with the interior of said vessel, substantially as described.

17. The combination with a submarine vessel having a well in its deck, of a buoy housed in said well, a door arranged in one side of said buoy, a corresponding door arranged in the side of the well, a frame attached to the well-casing and surrounding the door and provided with a rubber packing, a corresponding frame attached to the side of the buoy and surrounding the door in said buoy, bolts projecting through the well-casing and engaging the frame on the buoy, said bolts operating to draw said frame together water-tight, a hose communicating at one end with the interior of the buoy and at its other end with the interior of the vessel, a circular rack surrounding and attached to the buoy, and a crank-shaft projecting through the well-casing and provided with a pinion adapted to engage said rack to rotate the buoy and cause the said frames to register, substantially as described.

18. The combination with a submarine boat, of a buoyant cage, and an arm attached to the cage and pivotally connected to the vessel, substantially as described.

19. The combination with a submarine vessel, of a buoyant observation-cage, and two hollow arms pivotally connected at their opposite ends to and communicating with the interior of said cage and vessel, substantially as described.

20. The combination with a submarine vessel, of a buoyant observation-cage, two hollow arms pivotally connected at their opposite ends to and communicating with the interiors of said cage and vessel, a cable leading from said cage to said vessel, and means for winding up said cable to lower the cage, substantially as described.

21. The combination with a submarine vessel, of a buoyant observation-cage, two hollow arms pivotally connected at their opposite ends to, and communicating with the interiors of said cage and vessel, a drum journaled on the exterior of the cage and provided with a crank-shaft projecting through the side of the cage into the interior thereof, and a cable wound at one end about said drum and at its other end attached to said vessel, substantially as described.

22. The combination with a submarine vessel, of a buoyant observation-cage, two hollow arms pivotally connected at their opposite ends to, and communicating with the interiors of said cage and vessel, means for raising and lowering said cage, and a hood projecting from the upper end of the cage and provided with bull's-eyes, substantially as described.

23. The combination with a submarine vessel, of a buoyant observation-cage, two hollow arms pivotally connected at their opposite ends to, and communicating with the interiors of said cage and vessel, means for raising and lowering said cage, a hood projecting from the upper end of the cage and provided with bull's-eyes, an air-valve in the top of said hood arranged to be closed by the pressure of the water when submerged, and a spring operating to open said valve when the buoy is afloat to admit air to the latter, substantially as described.

24. The combination with a submarine vessel, of a buoyant observation-cage, two hollow arms pivotally connected at their opposite ends to, and communicating with the interiors of said cage and vessel, means for raising and lowering said cage, a hood projecting from the upper end of the cage and provided at its top with a cylindrical recess having a perforated bottom, a disk valve arranged in said recess and adapted to be closed by the pressure of the water when the cage is submerged, and a spring arranged beneath said valve and operating to raise the latter to admit air when the cage is afloat, substantially as described.

25. The combination with a submarine vessel having a well in its deck, of a buoyant observation-cage housed in said well, two hollow arms pivotally connected at their opposite ends to, and communicating with the interiors of said cage and vessel, and means for drawing said cage into said well, substantially as described.

26. The combination with a submarine vessel having a well in its deck, of a buoyant observation-cage housed in said well, two hollow arms pivotally connected at their opposite ends to, and communicating with the interiors of said cage and vessel, means for drawing said cage into the well, and means for passing back and forth from the vessel to the cage when the latter is housed, substantially as described.

27. The combination with a submarine vessel, of a buoyant observation-cage, two hollow arms pivotally connected at their opposite ends to, and communicating with the interiors of said cage and vessel, electrical signaling and controlling devices arranged in said cage, and conductors leading from said devices through the hollow arms to the interior of the vessel, substantially as described.

28. The combination with a submarine vessel having two wells respectively arranged in the forward and after part of the deck of observation-cages housed in said wells, hollow arms pivotally connected at their opposite ends to, and communicating with the interiors of said vessel and cages, and means for drawing said cages into said wells, substantially as described.

29. The combination with a submarine vessel, of fixed rigid, horizontally - projecting planes arranged upon the opposite sides of the vessel and extending fore and aft, said planes being provided with recesses, as shown, and flat pivoted vanes arranged in said recesses and when turned horizontally operating to form continuations of said planes, substantially as described.

30. The combination with a submarine vessel, of two pivoted vanes arranged on each side of said vessel and near the opposite ends of the latter, and means connecting said vanes to cause them to simultaneously turn in opposite directions, substantially as described.

31. The combination with a submarine vessel, of two shafts projecting transversely through said vessel, vanes fixed on the outer ends of said shafts, levers fixed between their ends on said shafts, and crossed cables attached to the opposite ends of said levers, whereby the said vanes are simultaneously turned in opposite directions, substantially as described.

32. The combination with a submarine vessel, of two shafts projecting transversely through said vessel, vanes fixed on the outer ends of said shafts, means connecting said shafts to cause the vanes to simultaneously turn in opposite directions, and mechanism actuated by the variation in the pressure of the water at the bow and stern for operating said vanes, substantially as described.

33. The combination with a submarine vessel, of two shafts projecting transversely through said vessel, vanes fixed on the outer ends of said shafts, means connecting said shafts to cause the vanes to simultaneously turn in opposite directions, hollow casings arranged in proximity to each of said shafts and connected at their lower ends with the water surrounding the vessel, flexible diaphragms arranged in said casings, stems actuated by said diaphragms, and arms fixed on said shafts and connected to said stems, whereby the depression of the bow or stern of the vessel causes a variation in the pressure of the water on said diaphragms and operates the vanes to place the vessel on an even keel, substantially as described.

34. The combination with a submarine vessel of two shafts projecting transversely through said vessel, vanes fixed on the outer ends of said shafts, cranks fixed on said shafts in the interior of said vessel, a cylinder, a piston arranged in said cylinder, piston-rods connected at their adjacent ends to said piston and at their opposite ends to said cranks, a spring arranged in one end of the cylinder for forcing the piston in one direction and means connecting the other end of said cylinder with the water surrounding the vessel, substantially as described.

35. The combination with a submarine vessel, of two shafts projecting transversely through said vessel, vanes fixed on the outer ends of said shafts, cranks fixed on said shafts on the interior of said vessel, a cylinder, a piston arranged in said cylinder, piston-rods connected at their adjacent ends to said piston and at their opposite ends to said cranks, a spring arranged in one end of the cylinder for forcing the piston in one direction, means connecting the other end of the cylinder with the water surrounding the vessel, and means for adjusting the tension of said spring, substantially as described.

36. The combination with a submarine vessel, of two shafts projecting transversely through said vessel, vanes fixed on the outer ends of said shafts, cranks fixed on said shafts on the interior of said vessel, a cylinder, a piston arranged in said cylinder, piston-rods connected at their adjacent ends to said piston and at their opposite ends to said cranks, a spring arranged in one end of the cylinder for forcing the piston in one direction, means connecting the other end of the cylinder with the water surrounding the vessel, means for adjusting the tension of the spring, and an indicator for indicating the tension to which the spring may be adjusted, substantially as described.

37. The combination with a submarine vessel, of two vertical propellers respectively arranged near the bow and stern of the vessel, means for rotating said propellers simultaneously in opposite directions, and a circuit closing and reversing device actuated by the fore-and-aft careening of the vessel for throwing said means into operation to put the vessel on a level keel, substantially as described.

38. The combination with a submarine vessel, of two vertical propellers respectively arranged near the bow and stern of the vessel, electric motors for rotating said propellers simultaneously in opposite directions, a battery for operating said motors, a circuit closing and reversing device actuated by the fore-and-aft careening of the vessel for throwing said motors into operation to put the vessel on a level keel, and means for adjusting said circuit closing and reversing device to make it respond more or less quickly to the movements of the vessel, substantially as described.

39. The combination with a submarine vessel, of two vertical propellers respectively arranged near the bow and stern of the vessel, electric motors for rotating said propellers simultaneously in opposite directions, a battery for operating said motors, two normally-open and reversely-connected circuits leading to the motors, and a circuit-closer controlling said circuits and comprising a base having four contacts arranged thereon and forming the terminals of said circuits, a metallic pendulum pivoted intermediate its ends to said base, and a wire connected at one end to said pendulum and at its other end to the said battery, whereby when the vessel is on a level keel the pendulum hangs free from engagement with all of said contacts and the motors are out of circuit, but when the vessel sinks by the bow or stern the pendulum swings into engagement with two of the contacts and throws said motors into circuit to place the vessel on a level keel, substantially as described.

40. The combination with a submarine vessel of two vertical propellers respectively arranged near the bow and stern of the vessel, electric motors for rotating said propellers simultaneously in opposite directions, a battery for operating said motors, two normally-open and reversely-connected circuits leading to the motors, and a circuit-closing device for controlling the motors and comprising a disk of insulating material having an annular groove formed therein, four binding-posts adjustably arranged in said groove and connected to the terminals of the motor-circuits, a metallic pendulum pivoted intermediate its ends to said disk and a wire connected at one end to the pendulum and at its other end to the battery, the arrangement being such that when the vessel is on a level keel the pendulum hangs free from engagement with all of the binding-posts, but when the vessel sinks by the bow or the stern said pendulum swings into engagement with two of the contacts and throws the motors into circuit to restore the vessel to a level keel, substantially as described.

41. The combination with a submarine vessel, of a weight provided with a wheel adapted to run upon the bottom or water-bed when the vessel is submerged, and means for raising and lowering said weight, substantially as described.

42. The combination with a submarine boat, of a weight provided with a wheel to run upon the bottom or water-bed, and mechanism for raising and lowering the weight at pleasure, the boat being adapted to lift and carry the weight when required, substantially as described.

43. The combination with a buoyant submarine boat, of a weight provided with a wheel to run upon the bottom or water-bed, the boat being provided with mechanism for raising and lowering the weight and for holding it at an adjusted distance from the bottom of the boat, substantially as described.

44. The combination with a buoyant submarine boat, of a weight movably attached to the boat and provided with a wheel to support the weight movably upon the bottom or water-bed, substantially as described.

45. The combination with a buoyant submarine boat, of a weight provided with a wheel to run upon the bottom or water-bed, means for ballasting the boat to cause it to remain suspended above the bottom when submerged and the said weight is resting on the bottom or water-bed, and means for raising and lowering the weight, whereby the boat may be moved at a uniform distance above the bottom or water-bed with the wheeled weight resting thereon, substantially as described.

46. The combination with a submarine vessel, of weights pivotally connected at their forward ends to the under side of the vessel and having wheels journaled in their after ends, cylinders arranged in said vessel, pistons fitted in the cylinders, piston-rods pivotally connected at their opposite ends to the pistons and said weights respectively and means for admitting water to the upper ends of said cylinders to project said weights downward to force the wheels into contact with the water-bed or bottom, substantially as described.

47. The combination with a submarine boat, of a weight arranged beneath the normal center of buoyancy of the boat, hoisting mechanism carried by the boat for raising and lowering the weight, and cables attached at their lower ends to the forward and after ends of said weight and at their upper ends to said hoisting mechanism, substantially as described.

48. The combination with a submarine boat, of a weight arranged fore and aft beneath the normal center of buoyancy of the boat, and flexible connections for suspending said weight to the boat, substantially as described.

49. The combination with a buoyant submarine boat, of a movable or traveling weight attached to the boat and provided with a wheel to support the weight movably upon the ocean-bottom, substantially as herein set forth.

50. The combination with a buoyant submarine boat, of a movable or traveling weight attached to the boat and provided with a caster-wheel to support the weight movably upon the ocean-bottom, substantially as herein set forth.

In testimony whereof I have hereunto set my hand in presence of two subscribing witnesses.

SIMON LAKE.

Witnesses:
  F. B. KEEFER,
  VINTON COOMBS.